United States Patent [19]
Crisinel et al.

[11] Patent Number: 6,162,477
[45] Date of Patent: Dec. 19, 2000

[54] PROCESS AND APPARATUS FOR TREATING FOOD PRODUCTS WITH OZONE

[75] Inventors: Pascal Crisinel, Guyancourt; Sylvie Le Royer, Beaucouzé, both of France

[73] Assignee: L'Air Liquide, Societe Anonyme pour l'Etude et l'Exploitation des Procedes Georges Claude, Paris, France

[21] Appl. No.: 09/244,654

[22] Filed: Feb. 4, 1999

[30] Foreign Application Priority Data

Feb. 4, 1998 [FR] France ................................. 98 01283

[51] Int. Cl.$^7$ ............................. A22C 25/00; A22C 21/00
[52] U.S. Cl. ...................... 426/256; 426/312; 426/643; 426/644; 426/646; 426/647; 426/474; 426/488; 99/467; 99/477; 99/516
[58] Field of Search ..................... 426/253, 256, 426/312, 643, 644, 646, 647, 474, 488; 99/467, 477, 516

[56] References Cited

U.S. PATENT DOCUMENTS 4,559,902 12/1985 Mason et al. ............................. 119/2
5,087,466 2/1992 Coudrains et al. ....................... 426/256

FOREIGN PATENT DOCUMENTS 284502 9/1988 European Pat. Off. .
2332058 1/1975 Germany .

OTHER PUBLICATIONS

Patent Abstracts of Japan vol. 012, No. 181 (C–499) May. 27, 1988 & JP 62 289164A (Kibun KK), Dec. 16.

Primary Examiner—Milton Cano
Attorney, Agent, or Firm—Nixon Peabody LLP; Robert M. Schulman

[57] ABSTRACT

A process for decolorizing, sanitizing and deodorizing a food product with ozone. The food product and water are mixed to form an initial solution and supplied to a pumping device to pressurize the solution. An ozone containing gas is injected into the initial solution in order to allow the treatment of the food product, without the occurrence of liquid/gas demixing. The apparatus includes a pumping device for pressurizing the solution, a contactor into which the pressurized solution is fed, a source of ozone, and at least one injector for injecting ozone into the solution.

45 Claims, 8 Drawing Sheets

PROCESS AND APPARATUS FOR TREATING FOOD PRODUCTS WITH OZONE

BACKGROUND OF THE INVENTION

1. Field of the Invention

The present invention relates to a process and apparatus plant for treating food products with ozone, aiming especially to bleach or decolorize, sanitize and deodorize the products thus treated.

2. Description of the Related Art

The literature relating to the ozone treatment of food products, in particular in the field of seafood (fish, crustacea, etc.) is known to be very extensive, and the reader may be referred for instance to documents FR-385,815, EP-294,502, FR-797,928 or else U.S. Pat. No. 4,559,902.

The use of ozone has thus been most particularly described in the case of the treatment of fish meat with the objective of sterilizing and deodorizing the meat, the treated fish meat coming from the recovery of the residues remaining on the bones and the head after filleting the fish, from fillet cutting scraps or even from actual fillets, the meat in question being eventually used as raw material for the manufacture of various products, such as surimi seafood products or other fish pastes, terrines or steaks.

A typical apparatus for the recovery and treatment of such fish meat for producing what those skilled in the art call "base surimi" seafood therefore comprises the following steps:

- a step of separating the meat from the bones and heads (resulting in a first crude pulp, which is ready to use if necessary);
- one or more operations of washing in water which optionally is slightly acidified, each washing operation being followed by a draining step (resulting in a washed pulp ready to use for some applications);
- a refining step making it possible, by passing the material over a screen, to separate the proteins from the impurities (skin residues, etc.);
- a final operation of mechanical water/meat separation carried out by centrifugal sedimentation or screw pressing, resulting in washed and refined fish meat ready to use (base surimi seafood).

The results of animal meat bleaching are commonly monitored by industrial sites by color measurements, called colorimetry, with readings of the brightness or whiteness, of the red/blue index and the yellow/green index, for example using the conventional $L^*/a^*/b^*$ system (CIE 1976 reference), the factor L being expressed in %.

For reasons of simplification, throughout the following text reference will be made, indiscriminately, to the L/a/b or L,a,b system or to their results, clearly keeping in mind that such references pertain to the abovementioned evaluation system.

The desired objectives, in terms of colorimetry, throughout the various washing operations carried out, are generally (depending on the product in question) an increase in the whiteness, a decrease in the redness and the absence of any change in yellows/browns or even a reduction in the latter.

The aforementioned document EP-A-284,502 describes in particular an apparatus for treating animal meat, consisting of a shell in which a hollow tube provided with a helical partition rotates, the whole assembly constituting a transverse screw, the free volume existing between the internal walls of the outer shell and the external helical partition of the hollow tube constituting a splashing chamber through which the meat/water mixture to be treated travels, the gas mixture containing ozone being injected into the hollow tube and diffusing outward into the splashing chamber through a plurality of diffusers located along the transfer screw.

The example provided by the document indicates a meat transfer rate inside the system of about 1 cm/s, which gives, taking into account the geometrical characteristics of the apparatus, a meat output of about 1 liter/minute.

Apart from the complexity of the system described in that document, work successfully carried out by the Applicants has allowed them to show that, because of the dynamics created in such an apparatus, the performance in terms of contact between the fish meat and the dissolved ozone is insufficient (no intimate mixing between the meat and the gas), leading to solid/gas demixing, but also, as a consequence, a lack of effectiveness over the entire diameter of the screw.

It may also be added that the use of gas injection pores for injecting the gas seems not to be very compatible with the cleanability requirements commonly practiced in the food industry (zones of the screw that are difficult to reach by a cleaning agent and potential blocking of the porous injectors with food material).

SUMMARY AND OBJECTS OF THE INVENTION

The present invention aims especially to remedy the abovementioned technical problems. It aims in particular to provide a process and apparatus for treating food products with ozone, making it possible:

- to improve the productivity of ozone-treated food products;
- to improve the quality of the transfer of ozone to the food product to be treated (it is known in practice that at the present time only 15 to 60%—depending on the plants available—of the ozone injected is actually transferred to the food product in question);
- to avoid, nevertheless, the risk of impairing the product (by way of illustration, mention may be made here of the risk of impairing fish meat by turning it brown because of local overdosing);
- to reduce overall the number of washing steps carried out in the user treatment chain;
- to achieve higher quality in the product.

To do this, the process for treating a food product according to the invention, of the type which comprises making the product come into contact with ozone, the product having been premixed in order to form an initial solution which, in addition to the product, contains water, is characterized by the combined implementation of the following steps:

a) a supply of the initial solution containing the product is used;

b) a pumping device is used which allows the initial solution to be taken under pressure to a contactor;

c) an ozone-containing treatment gas mixture is injected into the initial solution, the injection taking place at one or simultaneously at several of the following locations:
- between the initial supply and the pumping device;
- between the pumping device and the contactor;
- at one or more points in the contactor.

The "contactor" according to the invention is capable of allowing a sufficient time for contact between the product and the ozone injected into the solution in order to allow the required treatment, without the occurrence of liquid/gas demixing.

As will be clearly apparent to those skilled in the art, the "food products" intended by the present invention may be extremely varied, these comprising, by way of illustration, animal meat such as fish pulps but also other seafood such as mollusks or crustacea, butcher meats (beef, port, mutton, etc.), other food products such as the flesh of fruits or vegetables or purees thereof, or else products which may be termed "blood" products or other "blood-based" derivatives of the food industry. In particular, it is known that such blood derivatives are commonly recovered and reprocessed (especially for the purpose of separating the plasma from red proteinaceous bi-products) for the purpose of reusing them, not only for animal feed but also for human consumption, for example in the delicatessen field.

It will also be understood that ozone "treatment" according to the invention is intended, depending on the food product in question but also depending on the specification desired by each particular user site, for carrying out one or more of the following actions: bleaching or decoloration, disinfection, or else deoderization of the product.

Thus, by way of illustration, in order to exemplify the notion of "sufficient product/ozone contact time" according to the invention, we may consider the example of fish meat which is recovered from fish bones and heads resulting from filleting operations and is treated for the subsequent manufacture of "surimi"-type products; since the quality of this fish meat is evaluated, after treatment, according to the colorimetry method using the L/a/b system, a given user site will consider, for example, a sufficient contact time as being that to obtain a meat whiteness of up to at least 60% or even 70% on the L scale.

The "initial solution" according to the invention should be understood to mean a homogeneous or heterogeneous solid/liquid mixture.

As mentioned previously, the "initial solution" to be treated according to the invention may comprise one or more food products of extremely varied type.

Moreover, it will be understood that, depending on the application in question, the initial solution, which therefore includes the food product and water, may furthermore include additives, such as acids or bases, the role of which may especially be to adjust the pH of the medium in order to allow the water retention by the animal proteins to be controlled so as subsequently to make them easy to rinse and drain, or else antioxidants, such as ascorbic acid, or else stabilizers, such as EDTA, or even enzymes, or else polyphosphates or other sodium or calcium salts.

According to one of the ways of implementing the invention which is advantageous, the initial solution to be treated includes a compound of the peroxide family, such as hydrogen peroxide.

According to another of the ways of implementing the invention which is advantageous, the initial solution to be treated includes a compound of the organic-acid family, such as citric acid, acetic acid, succinic acid or lactic acid.

Without the Applicant being able at any moment to be bound by the explanation given below, it may be suggested that the presence of an organic acid in the initial solution facilitates, in the subsequent presence of ozone, the formation of very active peroxyacids (for example peracetic acid or else, by way of example, monopercitric or dipercitric acid).

According to another of the ways of implementing the invention which is advantageous, the initial solution to be treated includes a compound of the inorganic-acid family, such as nitric acid.

According to the invention, the "initial solution", which includes the product to be treated, entering the contactor is "under pressure", which should be understood to mean a pressure greater than atmospheric pressure, advantageously of between 0.1 and 10 bar relative but preferably of 0.2 to 2 bar relative.

The role of the contactor is to carry out what may be termed intimate mixing between the product to be treated and the ozone; it therefore makes it possible, on the one hand, to dissolve some or all of the ozone in the water and, on the other hand, to ensure that there is sufficient time for contact between the product and the dissolved ozone without the occurrence of demixing, this contact time having to be long enough to obtain the required level of treatment.

According to one of the embodiments of the invention, the contactor may be in the form of a tube reactor, such as one consisting of a pipe following a non-straight path, the tube reactor being provided with an inlet, allowing the solution coming from the pumping device to enter, and with an outlet capable of being connected downstream, for example to a device for storing the solution or else to an apparatus in which the solution may undergo an operation after the treatment.

By way of example of a "non-straight path", the pipe may advantageously have, over all or part of the portion lying between the inlet and outlet of the contactor, a structure consisting of one or more turns of circular or helical shape.

Again by way of illustration, the liquid/gas contactor according to the invention may also consist of a static mixer, such as those sold by the company SULZER.

According to one of the ways of implementing the invention, the product forming part of the composition of the initial solution is fish meat such as that obtained after an operation of separating the meat from the bones and/or the meat from the heads.

According to another of the ways of implementing the invention, the product forming part of the composition of the initial solution has, prior to said mixing, undergone one or more washing operations in an aqueous medium, this being, as required, slightly acidified (a draining step being inserted between two washing operations).

According to one of the ways of implementing the invention, after the treatment, the solution resulting from the treatment undergoes a draining step followed by one or more operations of washing the product in an aqueous medium, this being, if required, slightly acidified.

Moreover, the process according to the invention may have one or more of the following characteristics:

the ozone dose used for the treatment, expressed in grams of ozone per kilo of treated product, lies within the range going from 0.2 to 2 g/kg (taking into account not only the specificity of the treated product and of the desired treatment, but also, for example, the national legislation governing each user site).

The ozone dose will preferably lie within the range going from 0.3 to 1 g/kilo of product, and even more preferably within the range going from 0.4 to 0.9 g/kilo of treated product.

The ozone content in the treatment gas mixture lies within the range going from 10 to 200 $g/m^3$, preferably lies within the range going from 20 to 120 $g/m^3$ and more preferably within the range going from 40 to 100 $g/m^3$ of mixture.

The composition of the initial solution treated satisfies a degree of dilution corresponding to 1 volume of product per 0.5 to 10 volumes of water, but preferably to a degree of dilution corresponding to 1 volume of product per 1 to 5 volumes of water and even more preferably to a degree of dilution corresponding to 1 volume of product per 3 to 5 volumes of water.

The invention also relates to an apparatus for treating a food product, allowing the product to be brought into contact with the ozone, the product having been premixed in order to form an initial solution which contains, in addition to the product, water, the plant comprising:

a) a supply of the initial solution to be treated;

b) a pumping device suitable for the initial solution to be taken under pressure to a contactor;

c) a supply of a treatment gas mixture which contains ozone;

d) means for injecting the treatment gas mixture into the solution, allowing the mixture to be injected at one or simultaneously at several of the following locations:
between the initial supply and the pumping device;
between the pumping device and the contactor;
at one or more points in the contactor.

Further features and advantages of the present invention will appear more clearly in the following description, given by way of illustration but in no way implying any limitation, together with the appended drawings:

DETAILED DESCRIPTION OF PREFERRED EMBODIMENTS

Figure 1:
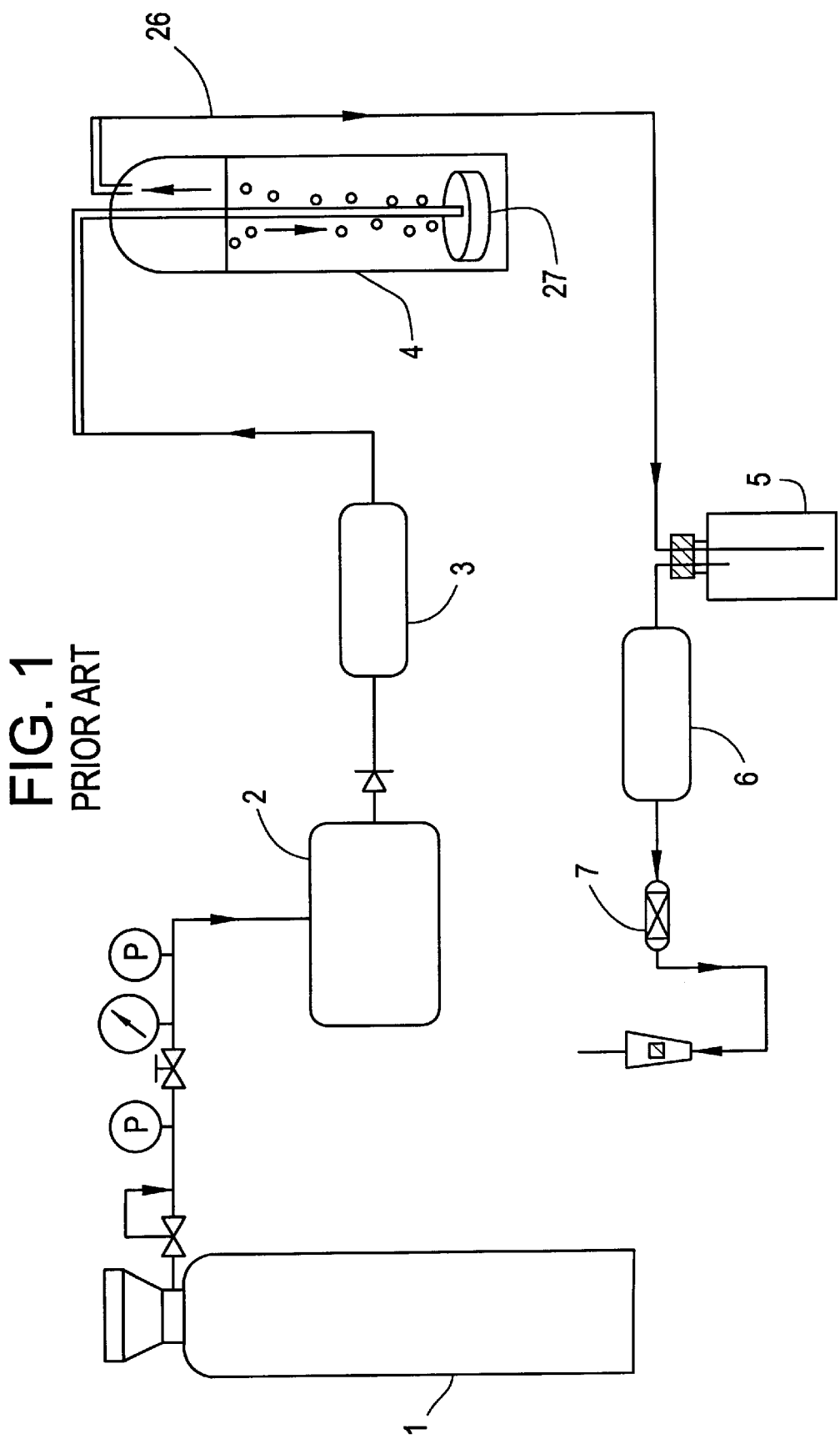
FIG. 1 is an apparatus for treating small quantities of food products with ozone according to the prior art.
Figure 2:
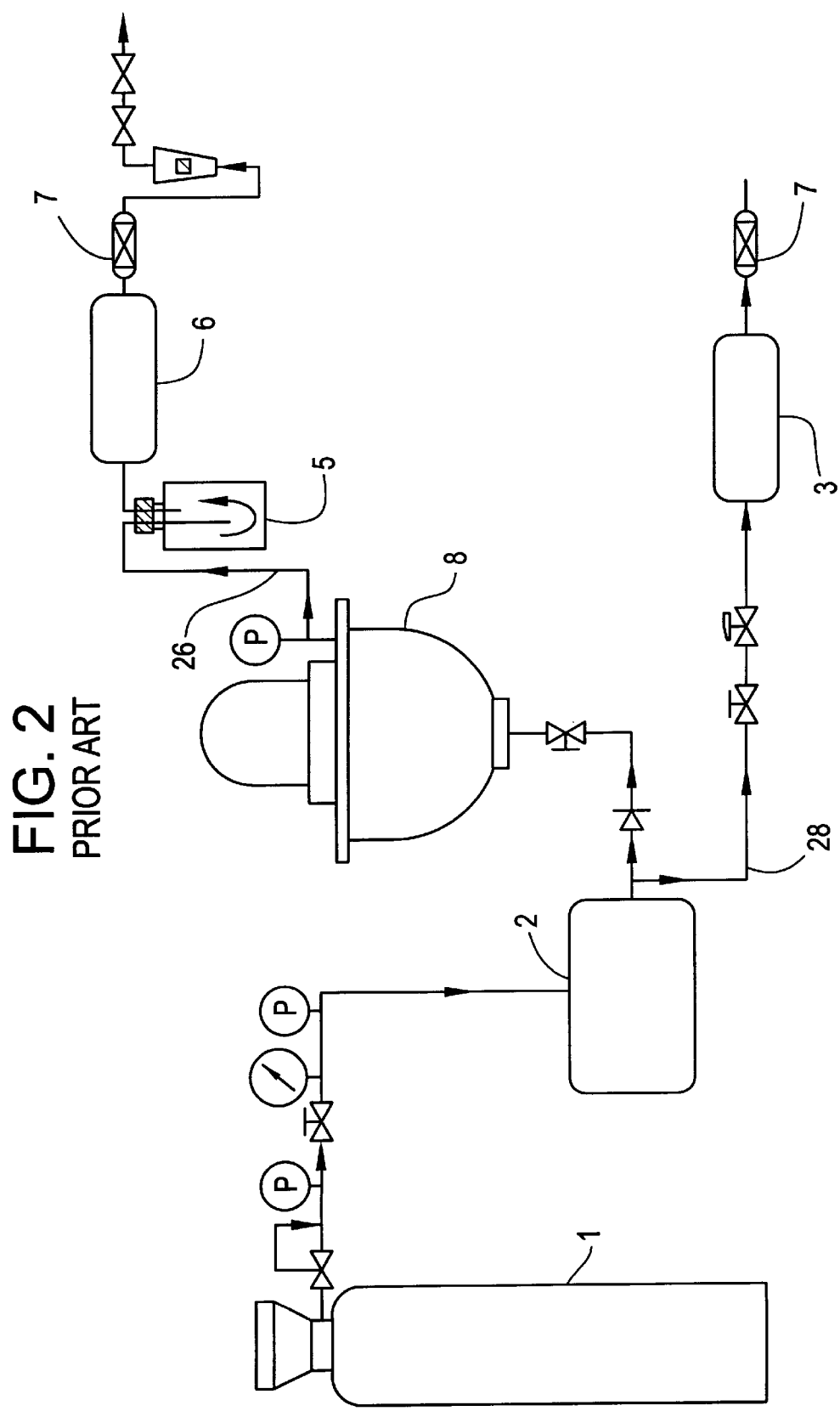
FIG. 2 is a diagrammatic representation of another apparatus for treating food products with ozone according to the prior art, employing injection into the bottom of a mixer.

FIGS. 1 and 2 illustrate two diagrammatic representations of apparatuses forming part of the prior art, which give poor results that may be regarded as being insufficient in terms of the degree to which the injected ozone in the process is transferred into the food product to be treated.

By way of illustration, the apparatus in FIG. 1 is suitable for treating very small amounts of fish meat with ozone.

This figure shows a supply 1 of a gas mixture containing oxygen, for example air, or even of pure oxygen, this being sent to an ozonizer 2, the treatment gas mixture obtained on leaving the ozonizer 2, containing ozone (and also oxygen) and being analyzed (3) before being sent to the reactor 4 which contains the fish meat to be treated in aqueous solution.

The ozone-containing treatment gas mixture, coming from the analyzer 3, is injected into the aqueous solution containing the fish meat via a single injector, this being a simple tube pierced with holes or else, as is the case in FIG. 1, a porous disk 27 at the bottom of the reactor 4.

In the case of the embodiment shown in the context of this FIG. 1, the initial solution containing fish meat is not stirred in the reactor 4.

In order to determine and monitor the degree of transfer of ozone into the solution, the apparatus has a recovery line 26 going from the cloud of gas present in the reactor above the solution, allowing this cloud of gas to be analyzed in an ozone analyzer 6 (after the recovered gas has passed through a purging bottle 5), the gas after analysis then being discharged into the external atmosphere after passing over a detoxifying catalyst unit 7.

In terms of the degree of transfer of injected ozone into the solution (which degree is known to depend on many parameters, including the ozone content of the gas injected, the acidity of the solution to be treated, its degree of dilution or else the charge of product to be treated), such a plant does not easily allow degrees of transfer exceeding 15 to 20% of the ozone initially present in the starting gas mixture to be achieved.

As regards FIG. 2, this illustrates an apparatus allowing larger quantities of fish meat to be treated, the apparatus combining a mixer 8 of the type commonly used in the food industry.

The solution to be treated, which contains the fish meat and water, is therefore in this case regularly stirred within the mixer 8.

As previously, discussed this figure again shows the supply 1 of oxygen-containing gas mixture which feeds the ozonizer 2, the treatment gas mixture coming from the ozonizer 2 and containing ozone (and oxygen) being sent toward the bottom of the mixer 8.

In order to know the flow rate, the ozone-containing treatment gas mixture is in this case analyzed by means of a branch line 28 tapped off the output of the ozonizer 2.

Here too, the gas cloud in the top of the mixer 8 is analyzed by means of the line 26, which includes the purging bottle 5, the analyzer 6 and the detoxifying catalyst unit 7.

The results obtained using such an apparatus show that the ozone transfer is still insufficient, this reaching, depending on the situation, 20 to 60% of the ozone initially present in the starting gas mixture.

Figure 3:
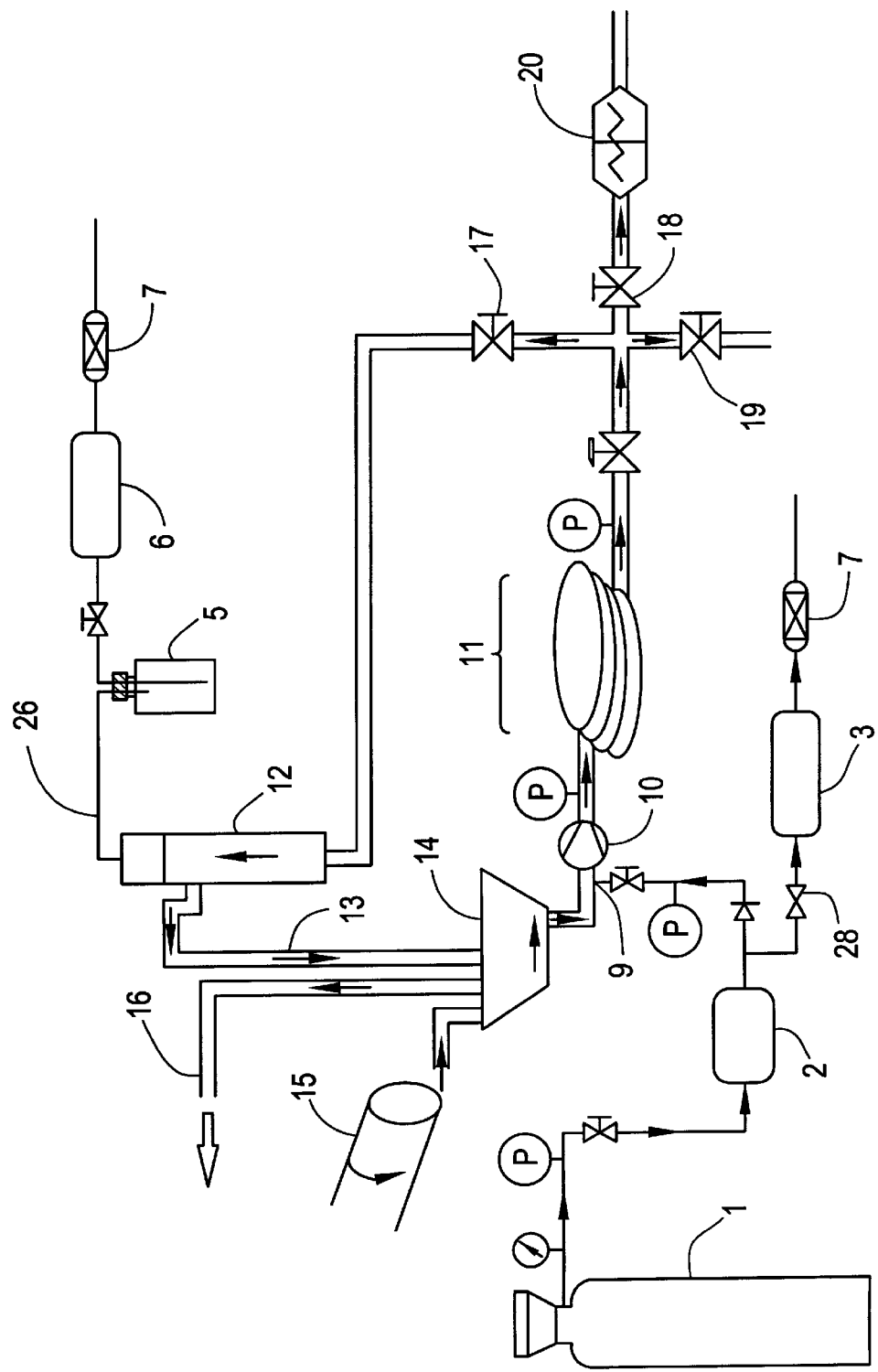
FIG. 3 is a diagrammatic representation of an apparatus for treating food products with ozone according to the invention, employing a contactor having a single series of circular turns.

FIG. 3 illustrates an apparatus for treating a food product with ozone according to the invention, which incorporates the combination of a pumping device 10 and a contactor 11 consisting of a set of circular turns.

In this figure may again be seen the supply 1 of oxygen-containing gas mixture (for example air or even pure oxygen) which feeds an ozonizer 2, producing as its output the treatment gas mixture which contains ozone (and therefore also oxygen, or even oxygen and nitrogen), as well as the tap-off line 28 allowing the treatment gas mixture leaving the ozonizer 2 to be analyzed.

The initial solution, which apart from the product contains water, is, in the embodiment shown, stored in a buffer tank 14, the product to be treated coming in the figure from a apparatus 15 which, depending on the application in question, may represent a very variable point in the manufacturing chain of the user site. By way of illustration, considering the case of the treatment of fish meat, the following examples may be mentioned:

the apparatus 15 may represent a separator (often called a "pulper") which separates the fish meat from the bones or heads after a filleting operation;

the apparatus 15 may also represent a draining step, this taking place after the meat previously separated from the bones and the head has been washed a first time in an aqueous solution;

the apparatus 15 may also represent a draining step taking place after an operation of washing in an aqueous solution of the meat initially separated;

still by way of illustration, the apparatus 15 may represent a refiner, which separates the meat from impurities (pieces of skin, etc.) remaining after the washing operation.

The initial solution to be treated which is in the buffer tank 14 is sent to the pumping device 10 and then to the contactor 11, the ozone-containing treatment gas mixture in this case being injected into the line going from the buffer tank 14 to the pumping device 10.

The initial solution resulting from the treatment in the contactor 11 is, depending on the case, directed by an advantageous system of valves 17, 18 and 19 to a centrifugal separator 20, which allows separation of the water from the meat thus treated, or else to a degassing column 12, from which the solution is extracted in order to be fed back into the buffer tank 14 via the line 13.

It will be noted that the valve 19 allows the treated solution coming from the contactor 11 to be sampled for the purpose of analyzing it, for example by colorimetry.

Here too, the gas cloud in the column 12 is analyzed via the line 26.

Depending on the case, the product may thus undergo one or more treatment operations in the loop which contains the tank 14, the contactor 11 and the recycling line containing the degassing column 12.

As regards the line 16, this is a line for extracting the gas phase present in the tank 14, this being extremely useful in the case of complete or partial recirculation of the initial solution after ozone treatment in the contactor 11.

As indicated previously, the ozone-containing treatment gas mixture, such as coming from the ozonizer, is injected here at the point 9 in the line connecting the buffer tank 14 to the pumping device 10 but, as explained in detail above, the injection of the treatment gas mixture could also take place at one or several of the locations lying between the tank 14 and the pumping device 10, between the pumping device 10 and the contactor 11, or even at several points in the contactor 11.

It should be noted that although all the turns of the contactor 11 have been shown in this figure in a horizontal situation, the plane of the turns could also lie in another position, for example in the vertical plane.

Figure 4:
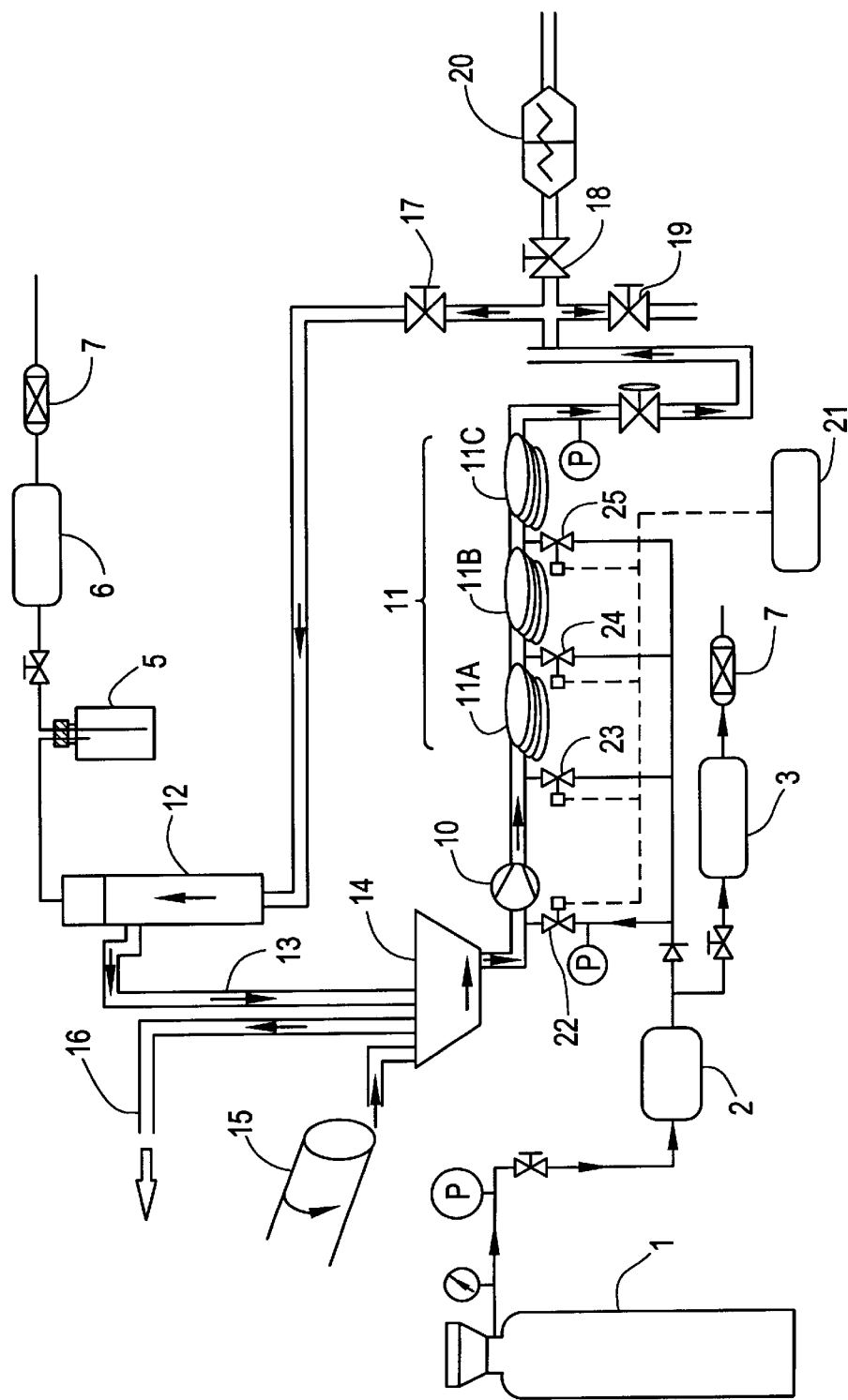
FIG. 4 is a diagrammatic representation of another apparatus for treating food products with ozone according to the invention, employing three series of circular turns.

FIG. 4 illustrates another apparatus for treating food products with ozone according to the invention, this being very similar to the apparatus previously described in the context of FIG. 3, the apparatus here differing by the structure of the contactor 11 which, in the embodiment shown, has a structure consisting of three series of circular turns.

Moreover, the apparatus allows the treatment gas mixture coming from the ozonizer 2 to be injected, via the system of valves 22, 23, 24 and 25, into one or more of the following locations: between the buffer tank 14 and the pumping device 10 (22), between the pumping device 10 and the first series of turns of the contactor 11 (23), between the two first series of turns (24) or else between the last two series of turns of the contactor 11 (25).

A device 21 for controlling the gas flow rate then allows one or more of the valves 22 to 25 to be selectively opened and allows the flow rate of mixture reaching each injection point to be controlled and regulated.

An apparatus such as that shown in FIGS. 3 and 4 has resulted in degrees of ozone transfer of at least 80%, or even of more than 90%.

An apparatus such as that described in the context of FIG. 4 was used to produce examples of implementation for the purpose of treating various categories of fish or poultry meat with ozone.

The results obtained after treatment are shown in the context of FIGS. 5 to 8 in terms of the variation in the calorimetric parameters L,a,b.

The colorimetric measurements were made using a MINOLTA CR210 system.

Each figure No. X shows the results of tests called XA, XB, XC, etc., respectively, the results of each test being given in terms of L,a,b colorimetry in the following manner: the L measurement (representative of the whiteness) is shown as a continuous line, the a measurement (representative of the red) is shown by a dashed line while the b measurement (representative of the yellow/brown) is represented by a dash-dot line.

By way of characteristics common to all the related tests below for ozone treatment according to the invention, the following elements may be noted:

the ozone-containing treatment atmospheres were obtained as output by an ozonizer of the OZONIA (type CF1) brand;

the initial solutions treated were conveyed to the contactor at a pressure of about 1 bar relative;

the particle size of the treated products (whether fish meat or poultry meat) was between 1 and 2 mm.

Moreover, it will be noted that, under the same conditions, slightly different results may be given in the appended figures, which will not be surprising to those skilled in the art who are familiar with the fact that the calorimetric results obtained after such treatment and washing operations are very sensitive to the initial state (especially in terms of freshness) of the batch of fish in question.

Let us now examine below the content of each of FIGS. 5 to 8.

Figure 5:
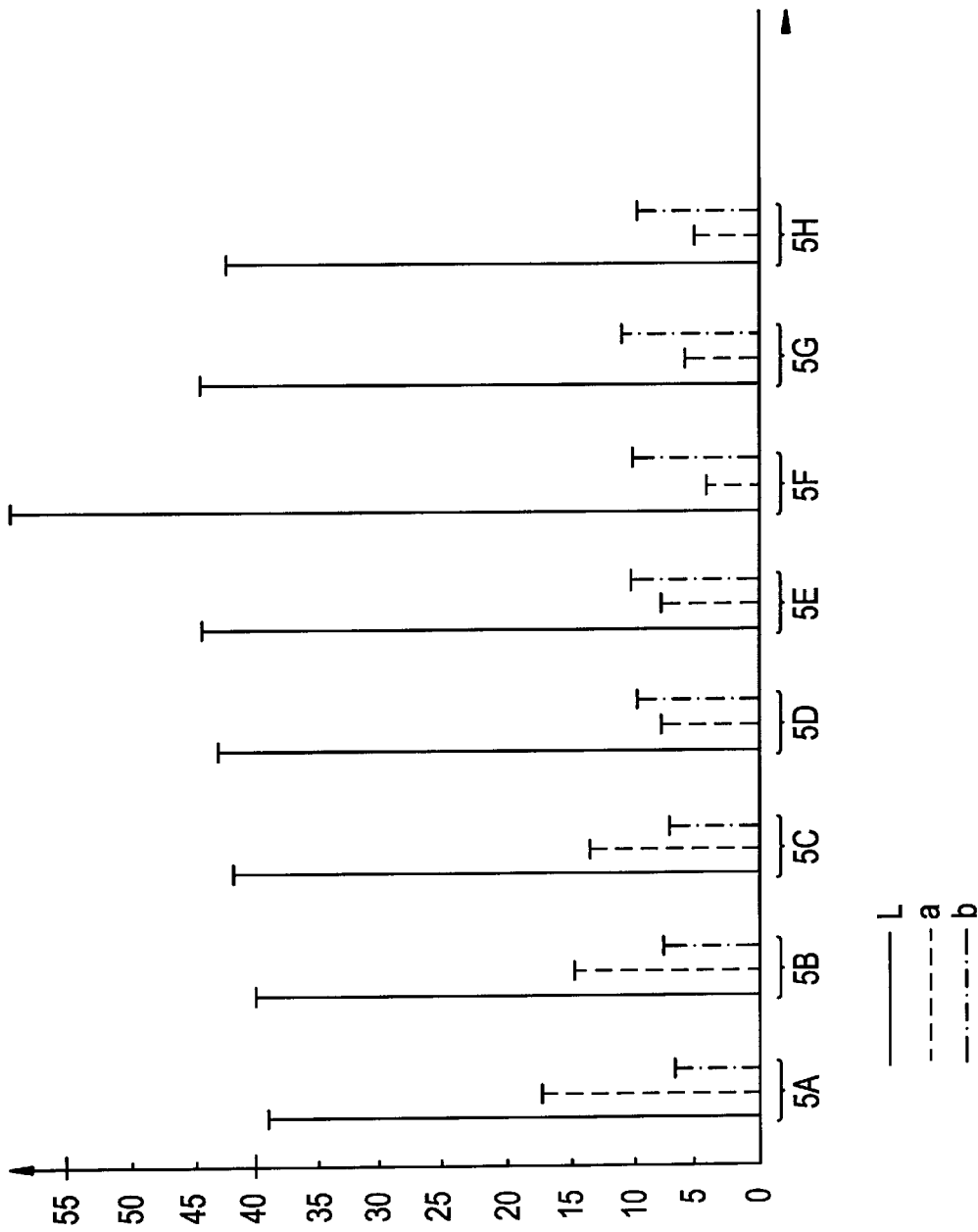
FIG. 5 shows results of measurements of L/a/b calorimetric parameters after ozone treatment according to the invention carried out on meat of fresh coalfish which has undergone, after the step of separating the meat from the bones, an operation of washing in an aqueous medium.

FIG. 5 relates to the variation in the L/a/b calorimetric parameters for fresh coalfish meat, the 8 tests 5A to 5H having been respectively obtained under the following conditions:

the measurements for Test 5A were obtained on coalfish meat obtained directly from the operation of separating the meat from the bones (this coalfish meat therefore not having undergone any operation of washing in water and no operation of ozone treatment according to the invention);

the results of Test 5B were obtained on coalfish meat having undergone, after the operation of separating the meat from the bones, a step of washing in water slightly acidified with citric acid (citric acid content of the washing solution approximately 0.2% of the mass of meat diluted—this fish meat therefore underwent this step of washing in water but was not treated with ozone by the process according to the invention);

the results of Test 5C were obtained on a coalfish meat which was subjected, after the operation of separating the meat from the bones, two steps of washing in water slightly acidified with citric acid, a draining step having been interposed between the two washing operations (citric acid content of the washing solution approximately 0.2% of the mass of meat diluted—this fish meat therefore underwent these steps of washing in water but was not treated with ozone by the process according to the invention);

the results of Tests 5D to 5H were obtained after ozone treatment according to the invention on the fish meat coming from the washing step mentioned above in the context of Test 5B, the ozone dose used for the treatment being respectively, in the case of each of the 5 tests, 0.2 g/kg of fish meat; 0.5 g/kg; 0.9 g/kg; 1.8 g/kg; and in the case of the last test 2 g/kg of meat.

In all these cases, the initial solution containing the fish meat is water slightly acidified with citric acid (citric acid content about 0.2% of the mass of treated meat diluted) and corresponds to a degree of dilution of 1 volume of product per 3 volumes of water.

The ozone-containing treatment gas mixture was in all these cases injected at a single point located between the buffer tank 14 and the pumping device 10.

The results given in FIG. 5 illustrate, for this batch of coalfish, the spectacular effect obtained by the ozone treatment according to the invention (the optimum being without doubt obtained here in the case of an ozone dose of about 0.9 g/kg of meat), giving rise to a marked increase in the whiteness (L) but, above all, to a very marked reduction in redness (a) while at the same time maintaining the factor (b) almost unchanged.

Moreover, it will be noted that coalfish meat has the reputation, for those skilled in this art, of being very difficult to bleach, particularly depending on the initial state of freshness of the product.

Two conclusions may be drawn from this first series of results:

on the one hand, it is possible, in order for this user site to economize on the additional washing steps normally involved after the first washing of the meat in aqueous medium which follows the step of separating it from the bones. It may in fact be seen that the results obtained by virtue of the invention are much better than those obtained after a first washing (5B) and even after a second conventional washing (5C);

on the other hand, it may be noted that a final product is obtained which is qualitatively different (spectacularly better) than that obtained from a conventional chain: in fact an optimum value of about 4 is obtained for the "a" factor, a value never obtained by this user site using the conventional washing/draining procedures which did not allow this "a" factor to be reduced below 8 or 9, whatever the number of washing steps carried out.

These results are confirmed by those given in FIG. 6, which again illustrates comparative results obtained on fresh coalfish meat which has undergone, after the step of separating the meat from the bones, not one but two successive operations of washing in an aqueous medium (with a draining step in between). Moreover, the following parameters were studied here: depending on whether or not the initial solution to be treated contains citric acid, for various degrees of dilution of the meat in the water of the initial solution, as well as for increasing ozone doses in the treatment atmosphere.

Figure 6:
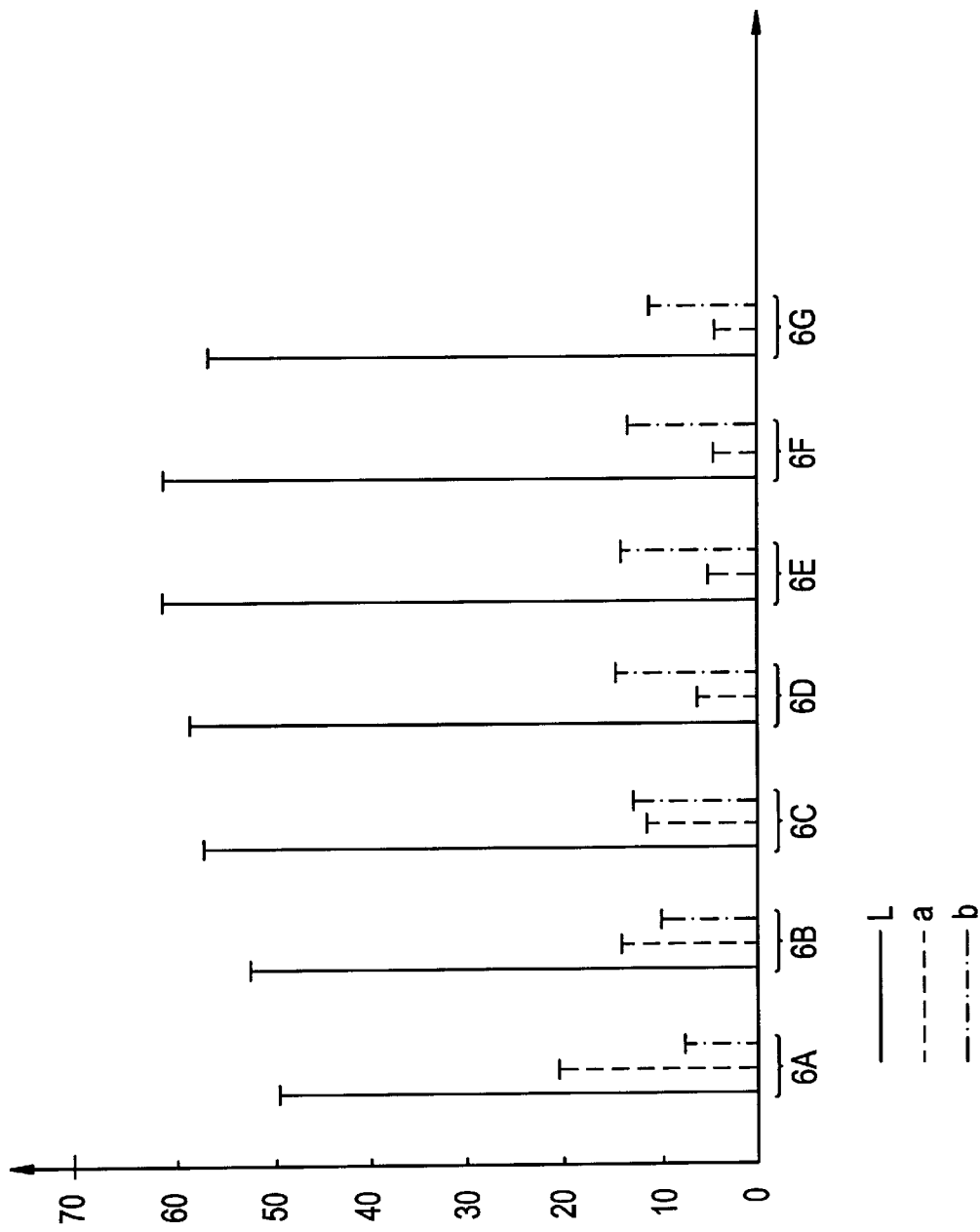
FIG. 6 gives other results of measurements of L/a/b calorimetric parameters after ozone treatment according to the invention carried out on meat of coalfish which has undergone, after the step of separating the meat from the bones, two successive operations of washing in an aqueous medium which come before and after an intermediate draining step (these tests have especially varied, in combination, the ozone dose, the parameter governing the presence/absence of citric acid in the solution, or the degree of dilution of the initial solution)

The various Tests 6A to 6G relating to this FIG. 6 were then obtained under the following conditions:

here again, the results of Test 6A were obtained on the coalfish meat resulting directly from the step of separating the meat from the bones (the meat tested here was therefore subjected neither to the operation of washing in water nor of the ozone treatment according to the invention);

here again, the result of Test 6B was obtained on a coalfish meat which had undergone, after the operation of separating the meat from the bones, a step of washing in water slightly acidified with citric acid (citric acid content approximately 0.2% of the mass of treated meat diluted—the meat tested here by colorimetry therefore underwent a step of washing in water but no operation of ozone treatment according to the invention);

the results of Test 6C were obtained on a coalfish meat which had undergone not only a first operation of washing in slightly acidified water but subsequently, after draining, a second operation of washing in water slightly acidified with citric acid (the meat tested here therefore underwent two successive steps—before and after a draining operation—of washing in water, but no operation of ozone treatment according to the invention);

the results of Test 6D were obtained by treating coalfish meat, such as that resulting from the abovementioned second operation of washing in water in Test 6C, with ozone, the initial solution containing this fish meat in this case not containing citric acid, and being characterized by a degree of dilution corresponding to one volume of meat per three volumes of water.

The ozone dose applied in this Test 6D is equal to 0.8 g/kg of treated meat (for an ozone content of the treatment gas mixture of approximately 80 g/m$^3$ of gas), the ozone-containing treatment gas mixture being injected at a single point located between the buffer tank 14 and the pumping device 10.

The results of Tests 6E and 6F were also obtained by treating the fish meat resulting from the abovementioned two first steps of washing in water, in this case also for a degree of dilution of the meat in the water of the initial solution equal to one volume of meat per three volumes of solution, the initial solution in this case containing, in contrast, a low citric acid dose.

Here, Tests 6E and 6F have used an ozone dose of 0.87 g/kg of meat and 1.2 g/kg of treated meat respectively (in the case of an ozone content of the treatment gas mixture of approximately 80 g/m$^3$ of gas) the ozone-containing treatment gas mixture here again being injected at a single point located between the buffer tank 14 and the pumping device 10.

The results of Test 6G were obtained by treatment according to the invention of the coalfish meat coming from the first two abovementioned steps of washing in water, the initial solution, which here also contains a small concentration of citric acid, and corresponds, on the other hand, to a degree of dilution of 1 volume of meat per 2 volumes of water.

The ozone dose applied in the case of this Test 6G is 0.92 g/kilo of treated meat (for an ozone content of the treatment gas mixture of approximately 80 g/m$^3$ of gas), again injected at a single point located between the buffer tank 14 and the pumping device 10.

These results, which are given in the context of FIG. 6, therefore confirm the spectacular effect obtained both in terms of whiteness and in reduction in red (with an optimum lying in the region of 0.9 to 1.2 g/kg of meat in the case of this batch which had undergone beforehand two steps of washing in water.

It will be noted that although the second washing (6C) by itself improves the whiteness, it leaves the a factor almost unchanged and, in all cases, the overall results obtained by virtue of this second washing remain inferior to those obtained according to the invention in the context of Tests 6D, 6E, 6F.

Figure 7:
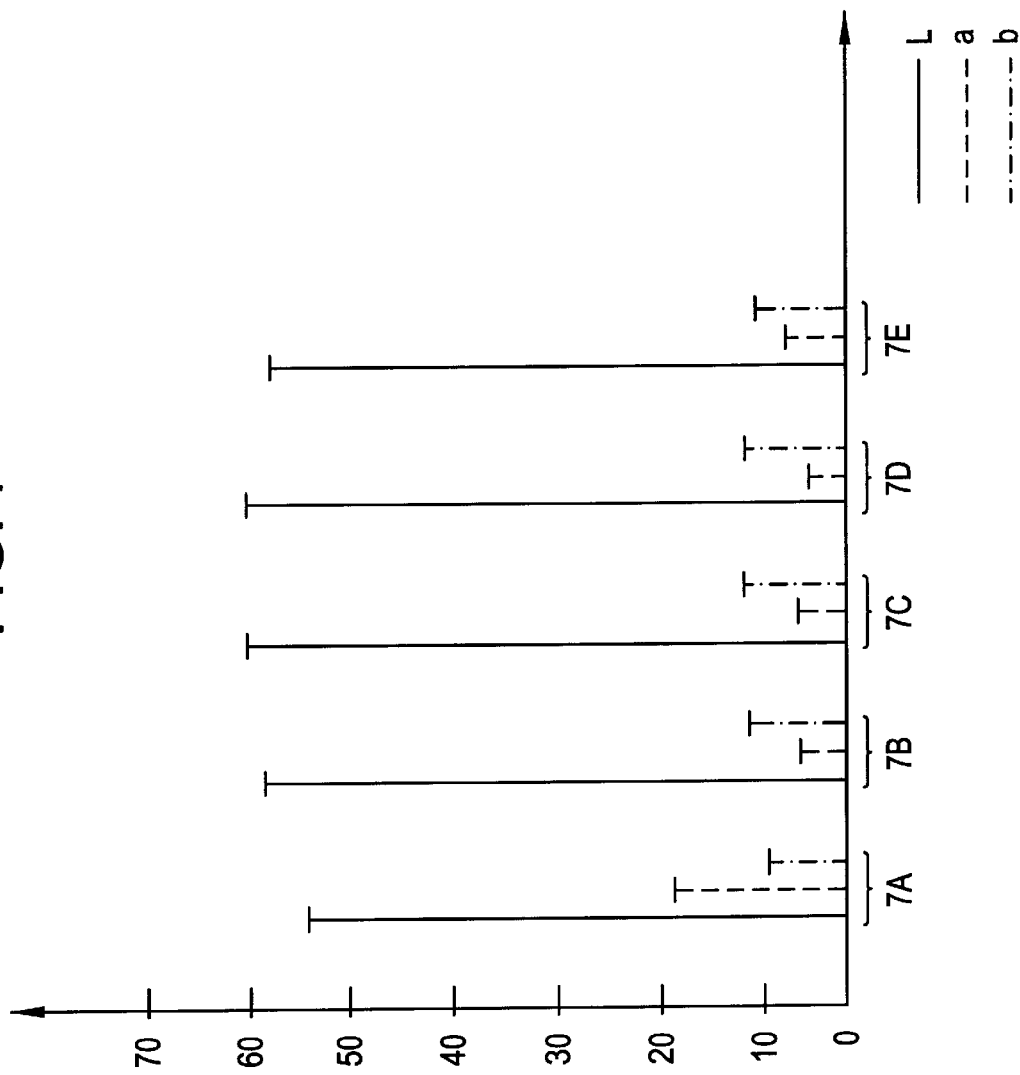
FIG. 7 shows other results of measuring calorimetric parameters of specimens of coalfish treated according to the invention, as a function of the degree of dilution of the initial solution.

FIG. 7 illustrates the calorimetric variation of coalfish meat specimens for varying degrees of dilution of the initial solution.

Tests 7A to 7E given in this FIG. 7 were then obtained under the following conditions:

here again, the results of Test 7A were obtained on a coalfish meat which had undergone, after the operation of separating the meat from the bones, a single step of washing in water slightly acidified with citric acid (the specimen tested in terms of colorimetry in the context of this Test 7A therefore underwent only an operation of washing in water but no operation of ozone treatment according to the invention);

The results of Tests 7B to 7E were obtained after ozone treatment according to the invention of specimens of coalfish meat as obtained after two operations of washing in water slightly acidified with citric acid (the fish meat specimens treated here according to the invention therefore result, after separation from the bones and from the head, from two successive operations of washing in water acidified with citric acid).

Tests 7B to 7E were all obtained under ozone dose conditions corresponding to 0.4 grams of ozone per kilo of treated meat (for an ozone content of the treatment gas mixture of approximately 40 g/m$^3$ of gas), the treatment atmosphere being always injected at a single point located between the buffer tank 14 and the pumping device 10.

The initial solution for these four tests was slightly acidified with citric acid (citric acid content approximately 0.2% of the mass of treated meat diluted).

The meat/water degree of dilution of the initial solution was, in each of the four cases, 1 volume of meat per 1 volume of water, 1 per 2, 1 per 3 and 1 per 5, respectively.

These results therefore show, for the batch of coalfish treated, results that are already excellent as from 0.4 g of ozone per kg of treated meat, with an optimum degree of dilution of the initial solution lying, as previously, approximately from 1 per 3 to 1 per 2.

Figure 8:
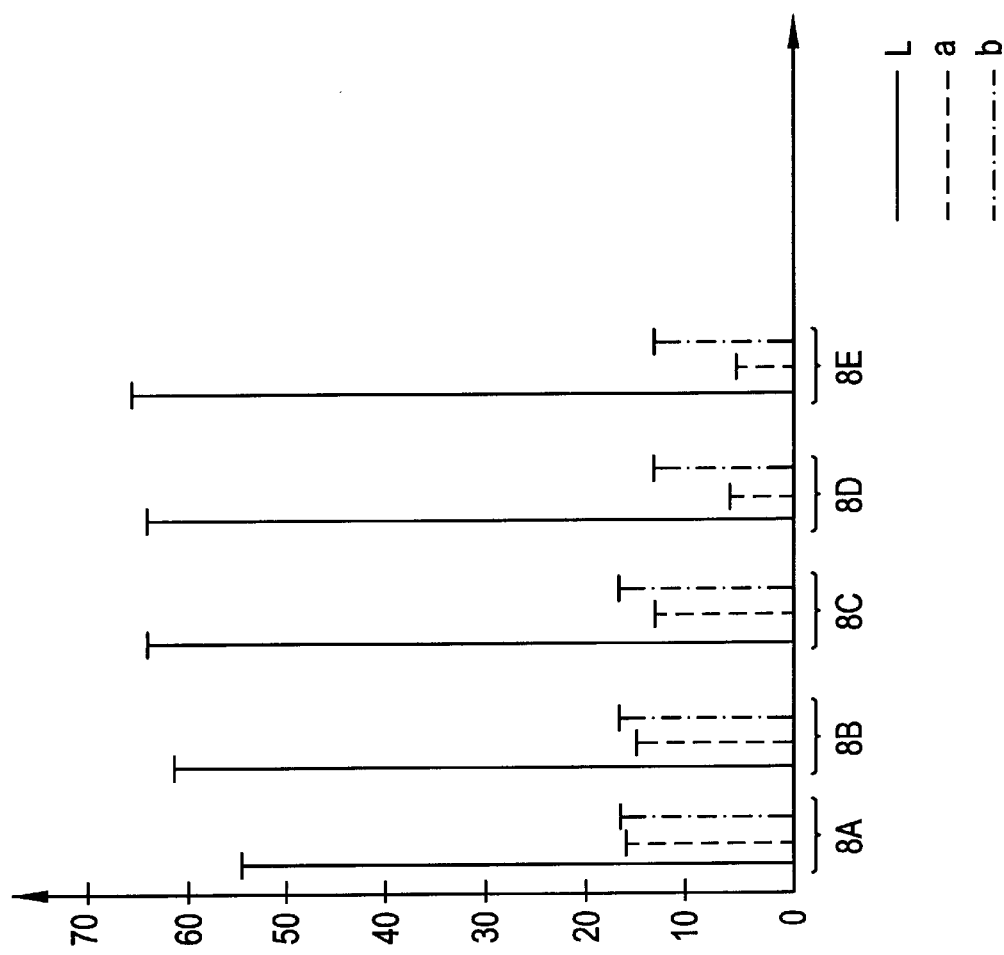
FIG. 8 gives results of measuring calorimetric parameters on specimens of salmon treated with ozone according to the invention.

As regards FIG. 8, this illustrates the variation in the calorimetric parameters on salmon specimens, the five tests shown in FIG. 8 having been obtained respectively under the following conditions:

The results of Test 8A were obtained on a salmon meat such as that obtained directly after the operation of separating the meat from the bones (the measured specimens here therefore had not undergone either an operation of washing in water or an operation of ozone treatment according to the invention);

The results of Test 8B were obtained on a salmon meat which had undergone, after the operation of separating the meat from the bones, an operation of washing in water (the specimens measured here therefore had been subjected to a single operation of washing in nonacidified water and no operation of ozone treatment according to the invention);

The results of Test 8C were obtained on a salmon meat which had undergone, after the operation of separating the meat from the bones, an operation of washing in water, this time slightly acidified with citric acid (the measured specimens here had therefore been subjected to a single operation of washing in acidified water and no operation of ozone treatment according to the invention);

The results of Tests 8D and 8E were obtained after ozone treatment according to the invention of salmon specimens such as those coming from the operation of washing in water mentioned previously in the case of Test 8B.

In both cases, the ozone dose applied was 0.6 grams of ozone per kilo of salmon meat treated and the degree of dilution of the initial solution was 1 per 2.

On the other hand, the initial solution treated, in the case of Test 8D, contained no citric acid, whereas the initial solution treated in the case of Test 8E was slightly acidified with citric acid.

It may firstly be observed from reading these results that the step of washing the salmon pulp in water alone (8B) already improves the whiteness L, but leaves the measurement of the redness, a, more or less unchanged, whereas the washing in acidified water of Test 8C further improves these results somewhat.

As regards the ozone treatment (8D) according to the invention, this makes it possible not only to improve the whiteness appearance but above all it allows a spectacular red reduction, while even improving here the b factor.

Finally, it will be noted that the addition of citric acid to the initial solution treated in the case of Test 8E improves the results obtained compared with Test 8D (i.e. compared with a nonacidified initial solution) essentially with respect to the L factor.

Apart from the tests given in the context of FIGS. 5 to 8, complementary tests were carried out in order to characterize the advantage, in certain cases, of using not a single injection of the treatment gas mixture upstream of the pumping device but a multiple injection.

By way of illustration, three types of whiting specimen were tested by colorimetry:

a first type of whiting meat specimen having undergone, after the operation of separating the meat from the bones, three steps of washing in water slightly acidified with citric acid—these steps being separated by a draining step—(the meat tested here by colorimetry has therefore undergone operations of washing in slightly acidified water but no operation of ozone treatment according to the invention);

a second type of whiting meat specimen having undergone, after the operation of separating the meat from the bones and then the three steps of washing in water slightly acidified with citric acid that was mentioned previously—these steps being separated by a draining step—, an ozone treatment according to the invention (the ozone dose used for the treatment is approximately 0.6 g/kg of fish meat and the initial solution containing the fish meat and water slightly acidified with citric acid corresponds to a degree of dilution of 1 per 5, the ozone-containing treatment gas mixture here being injected at a single point located between the buffer tank 14 and the pumping device 10);

a third type of whiting meat specimen having undergone, after the operation of separating the meat from the bones and then the three steps of washing in water slightly acidified with citric acid that was mentioned above—these steps being separated by a draining step—, an ozone treatment according to the invention (the ozone dose used for the treatment here is again approximately 0.6 g/kg of fish meat and the initial solution containing the fish meat and water slightly acidified with citric acid also corresponds here to a degree of dilution of 1 per 5, but, on the other hand, the ozone-containing treatment gas mixture here is injected simultaneously at two points (half the amount between the buffer tank 14 and the pumping device 10 via the valve 22 and the other half of the amount between the two first series of turns of the contactor via the valve 24).

The results obtained for these three types of whiting specimen confirm the effectiveness of the ozone treatment according to the invention as soon as there is one injection (whiteness greater than 60%, "a" factor approximately 3 and "b" factor approximately 12) but show that, by implementing a double injection of the mixture (22/24), although the "L" and "a" factors remain relatively unchanged compared with the single injection, the "b" factor in this case is markedly reduced by approximately ⅙th.

Without the Applicant being at any time bound by the explanation given above of the phenomena observed, it may be suggested that the results observed here in the context of multiple injection are without doubt linked to a marked reduction in the risk of excessive local oxidation of the color pigments of the meat treated.

It is known that poorly controlled oxidation of the product can give rise to a product of degraded (for example "burnt") appearance which cannot easily be used, the more so because the phenomenon is irreversible.

Moreover, tests were made in which the ozone-containing treatment mixture is injected at three points, via the valves 22, 23 and 24, into tuna meat, or even poultry meat.

These tests show spectacular results in terms of whiteness (L coefficients ranging from 64 to 70%) compared with the same meat treated by the user site according to its normal multiple washing/draining process, while still resulting in a red reduction of approximately 50% and leaving the b factor unchanged, or even reduced.

Moreover the tuna or poultry meat thus tested was evaluated, after treatment according to the invention, from a microbiological standpoint. The results obtained show a very significant gain from a health standpoint, with a total flora reduction having a value of one log or even up to 1.6 log. The poultry-meat handling industry is aware of the importance of this microbiological aspect and is constantly preoccupied with it.

The poultry or fish meat thus treated therefore exhibits a very attractive microbiological balance, and yet no denaturing of the functional properties of the proteins (for example, their gelling power) is observed.

Just as in the case of certain results commented upon previously in the case of fish meat, it should be emphasized that such a final poultry meat quality, especially in terms of the "a" factor, could not previously be obtained by the user site in question on its conventional treatment line, even after a very large number of washing/draining operations.

Although the present invention has been described with regard to particular embodiments, it is not thereby limited to them but, on the contrary, is capable of any modification and variation that might occur to those skilled in the art. Thus, although the invention has more particularly been exemplified in its performance and advantages in the case of fish and poultry meat, it will be understood in light of all the spectacular results described above that it will be applicable in many other fields of food products such as, for example, crustacea and other shell fish, or even butcher meat or fruit or vegetable pulp.

Likewise, although tube contactors, having one or more series of turns (for example circular or even helical turns), have more particularly been described throughout the foregoing, other types of contactors, for example those consisting of one or more static mixers in series (such as those sold by the company SULZER), may be envisaged, the key principle being in fact to achieve, by means of this device, what may be termed intimate mixing between the product to be treated and the ozone; it therefore makes it possible, on the one hand, to partially or completely dissolve the ozone in water and, on the other hand, to allow sufficient time for contact between the product and the dissolved ozone without any demixing occurring, this contact time having to be sufficient to obtain the required level of treatment.

It will therefore be understood that such a device makes it possible to create over the flow of initial solution passing through it a certain pressure drop, which it is possible to control, favoring exchange, while still ensuring that there are dynamic flow conditions avoiding dead volume regions or zero-velocity regions.

What is claimed is:

1. A process for treatment of a food product, comprising the steps of:
   (i) premixing the product with water to form an initial solution;
   (ii) injecting a treatment gas comprising ozone into the initial solution; and
   (iii) contacting the initial solution under pressure with the treatment gas for a sufficient period of time to allow treatment of the food product without occurrence of liquid/gas demixing and to obtain a treatment solution.

2. The process according to claim 1, wherein the product is fish meat.

3. The process according to claim 2, wherein the product is fish meat obtained (1) by separating the meat from at least one of the bones and the heads of the fish or (2) after an operation of grinding fillets.

4. The process according to claim 1, wherein the product is butcher meat.

5. The process according to claim 4, wherein the butcher meat is obtained after an operation of separating the meat from the carcass.

6. The process according to claim 1, wherein the product is poultry meat.

7. The process according to claim 6, wherein the poultry meat is obtained after an operation of separating the meat from the carcass.

8. The process according to claim 1, wherein the product is fruit flesh or vegetable matter or a purée thereof.

9. The process according to claim 1, further comprising the step of washing the product, prior to said step of premixing, one or more times in an aqueous medium.

10. The process according to claim 1, further comprising, after the treatment, the step of draining the product from the solution resulting from the treatment and washing the product in an aqueous medium one or more times.

11. The process according to claim 1, wherein ozone is present in the product during the treatment in a dose between from 0.2 to 2 grams of ozone per kilogram of product.

12. The process according to claim 11, wherein the dose lies within the range going from 0.3 to 1 g/kg.

13. The process according to claim 12, wherein the dose lies within the range going from 0.4 to 0.9 g/kg.

14. The process according to claim 1, wherein said treatment gas mixture comprises ozone in an amount within the range going from 10 to 200 $g/m^3$.

15. The process according to claim 14, wherein the amount of ozone in the treatment gas lies within the range going from 20 to 120 g/m$^3$.

16. The process according to claim 15, wherein the amount of ozone in the treatment gas lies within the range going from 40 to 100 g/m$^3$.

17. The process according to claim 1, wherein said initial solution satisfies a degree of dilution corresponding to one volume of product per 0.5 to 10 volumes of water.

18. The process according to claim 17, wherein the degree of dilution corresponds to one volume of product per 1 to 5 volumes of water.

19. The process according to claim 18, wherein the degree of dilution corresponds to one volume of product per 3 to 5 volumes of water.

20. The process according to claim 1, wherein the pressure during said contacting step lies within the range going from 0.1 to 10 bar relative.

21. The process according to claim 20, wherein the pressure range goes from 0.2 to 2 bar relative.

22. The process according to claim 1, wherein said initial solution comprises an organic acid.

23. The process according to claim 1, wherein said initial solution comprises a basic compound.

24. The process according to claim 1, further comprising the step of feeding said initial solution into a supply prior to said injecting step.

25. The process according to claim 1, further comprising the step of pressurizing the initial solution prior to said step of contacting the initial solution with ozone.

26. The process according to claim 25, further comprising the step of recycling all or part of the treatment solution to a point in the process prior to said pressurizing step so as to allow a new pass through said contacting step for treatment with said treatment gas comprising ozone.

27. The process according to claim 26, further comprising the step of temporarily storing the treatment solution, before it reaches the pressurizing step in a degassing column.

28. The process according to claim 25, wherein said pressurizing step is carried out with a pump.

29. The process according to claim 25, wherein said step of injecting the treatment gas comprising ozone into the initial solution occurs during at least one of:

between said premixing step and said pressurizing step;

between said pressurizing step and said contacting step; and during said contacting step.

30. The process according to claim 29, further comprising the step of injecting the treatment gas into the initial solution at multiple locations during said contacting step.

31. The process according to claim 1, wherein said step of contacting said initial solution with the treatment gas occurs in a contactor.

32. The process according to claim 31, wherein said contactor is a liquid/gas static mixer.

33. The process according to claim 31, wherein said contactor is in the form of a tube reactor.

34. The process according to claim 33, wherein said tube reactor comprises a pipe following a non-straight path, an inlet for said initial solution and an outlet for the treated solution.

35. The process according to claim 34, further comprising the step of storing the treated solution from the outlet of said contactor or further processing the treated solution from the outlet of said reactor.

36. The process according to claim 34, wherein the pipe comprises, over all or part of the portion between the inlet and the outlet of the contactor, a structure formed by one or more circular or helical turns.

37. The process according to claim 31, further comprising the step of injecting the treatment gas into the initial solution at one or more points in the contactor.

38. The process according to claim 1, further comprising, after said contacting step, at least one of the steps of (1) storing and (2) further processing all or part of the treatment solution.

39. An apparatus for treating a food product comprising;
 a) a supply of an initial solution comprising a premix of the food product and water;
 b) a pumping device for pressurizing the initial solution provided by said supply;
 c) a contactor into which the pressurized initial solution is fed and which is adapted to allow treatment of the food product with the treatment gas without occurrence of liquid/gas demixing;
 d) a source of a treatment gas mixture comprising ozone; and
 e) at least one injector for injecting the treatment gas mixture into the initial solution.

40. The apparatus according to claim 39, wherein said contactor is a liquid/gas static mixer.

41. The apparatus according to claim 39, wherein said contactor is in the form of a tube reactor comprising an inlet allowing said initial solution coming from the pumping device to enter and an outlet.

42. The apparatus according to claim 41, wherein said tube reactor comprises a pipe following a nonstraight path.

43. The apparatus according to claim 42, further comprising at least one of a device for storing the solution and an apparatus in which the solution may undergo an operation after said treatment, connected to said outlet of said tube reactor.

44. The apparatus according to claim 42, wherein the pipe comprises over all or part of the portion lying between the inlet and the outlet of the contactor, a structure comprising one or more circular or helical turns.

45. The apparatus according to claim 39, wherein said at least one injector is provided at one or simultaneously at several of the following locations:

between said initial supply and the pumping device;

between the pumping device and the contactor;

at one or more points in the contactor.

* * * * *